May 8, 1962 J. M. HUSVAR ET AL 3,032,840
WINDLACE RETAINING MEANS
Filed July 18, 1960 2 Sheets-Sheet 1

INVENTORS
Joseph M. Husvar and
BY George K. Metz
Wayne B. Easton

May 8, 1962   J. M. HUSVAR ET AL   3,032,840
WINDLACE RETAINING MEANS
Filed July 18, 1960   2 Sheets-Sheet 2

INVENTORS
Joseph M. Husvar and George K. Metz
BY
Wayne R. Easton

United States Patent Office 3,032,840
Patented May 8, 1962

3,032,840
WINDLACE RETAINING MEANS
Joseph M. Husvar and George K. Metz, South Bend, Ind., assignors to Studebaker-Packard Corporation, South Bend, Ind., a corporation of Michigan
Filed July 18, 1960, Ser. No. 43,690
5 Claims. (Cl. 20—69)

This invention relates to retaining means for attaching windlace material to the door opening of an automobile body.

An object of the invention is to provide new and improved means for attaching windlace material to the door opening of an automobile body.

Other objects of the invention will become apparent from the following specification, the drawings relating thereto, and the appended claims.

Figure 1:
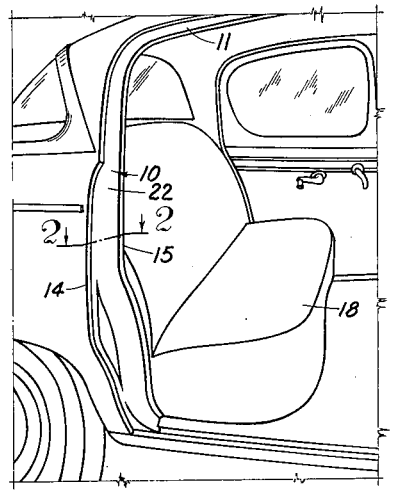
FIG. 1 is a partial perspective view of the side of an automobile showing a portion of a door opening where the new and improved means of the present invention for attaching windlace material may be utilized.

FIG. 1 of the drawings is a partial perspective view of the side of an automobile which shows the rear door opening to which the invention may be applied. The door opening has a generally vertically extending jamb portion 10 and a generally horizontally extending header portion 11. Attached to the outer edge of the door opening is a weathersealing strip 14 and attached to the inner edge of the door opening is a windlace strip 15.

Windlace strip 15 has two functions which are to weather seal the inner edge of the door to prevent drafts and to trim the inner edge of the door opening. The portion of the windlace strip 15 adjacent the top of seat 18 is subjected to a considerable amount of wear by reason of passengers entering and leaving through the door opening and there is also a tendency for the windlace strip to be pulled out. The present invention has for one of its objects the providing of means for more securely gripping or holding the inserted part of the windlace to resist pulling out of the windlace by reason of passengers brushing against it.

Figure 2:
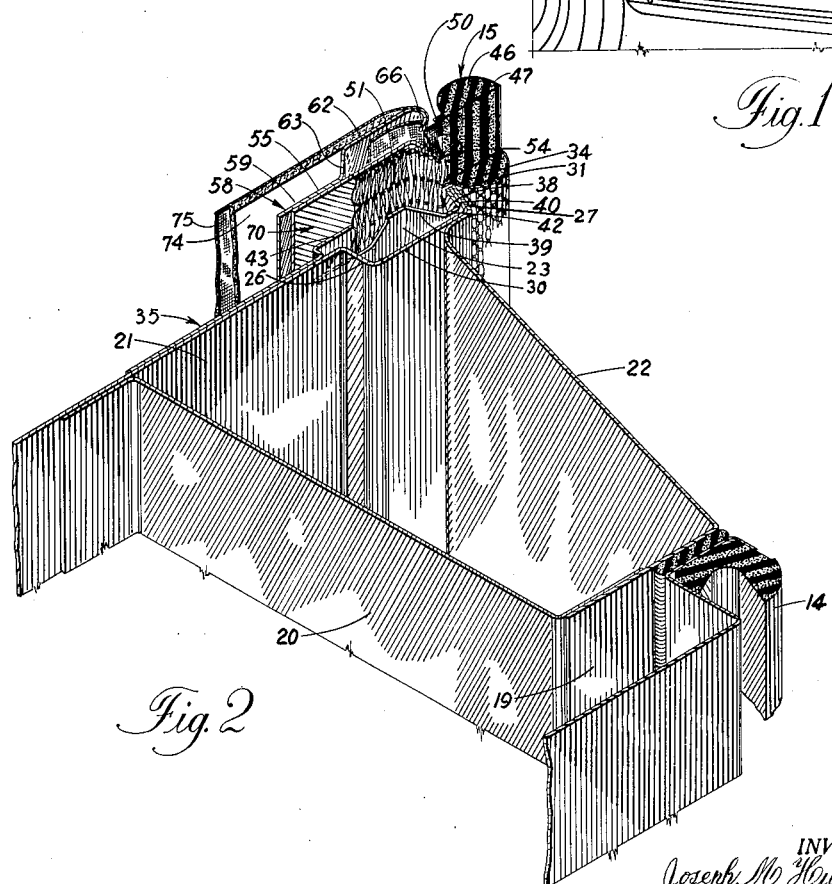
FIG. 2 is an isometric sectional taken on line 2—2 of FIG. 1.
Figure 5:
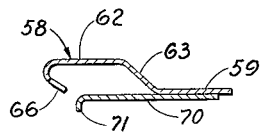
FIG. 5 is a sectional view taken on line V—V of FIG. 4.

FIG. 2 shows a section through the left door jamb 10 of the door opening and this section may comprise the conventional box section pillar having four vertically extending sides 19, 20, 21 and 22. Weatherseal strip 14 extends along the outer edge of the door opening along the junction of pillar sides 19 and 22 but does not represent any part of the invention.

Pillar side 21 has, in section, a recessed channel portion 23 adjacent the inside edge of the door opening which is formed by side portions 26 and 27 and a bottom portion 30. Pillar side 22 has an offset flange portion 31 which is welded to side channel portion 27 of pillar side 21 to form the inside edge 34 of the door opening.

A mounting strip 35 is attached to pillar side 21 and frames or extends around the inside edge 34 of the sides and top of the door opening. Mounting strip 35 has a channel section 38, which is disposed in the channel section 23 of pillar side 21, and has channel sides 39 and 40 and a channel bottom 42. Spaced inwardly from channel 38 of mounting strip 35, on the side of channel 38 away from inner edge 34 of the door opening, are a plurality of tabs 43 which may be formed by a lancing operation and which are hinged on the side away from the channel 38.

Windlace strip 15 comprises a cylindrical beaded portion or core 46 of rubber covered by a fabric material 47 which material continues to form a lip or flat portion 50 which extends radially from core 46. Another strip of material 51 is attached to lip portion 50 and by reason of the joint between strip of material 50 and 51 there is formed a protruding portion 54 intermediate core 46 and the free end 55 of strip 51. In a sense portions 50 and 51 can be considered a single flat portion extending radially from beaded portion 46 and having a protruding portion 54 between the attached and free ends of the flat portion which consists of portions 50 and 51.

Figure 3:
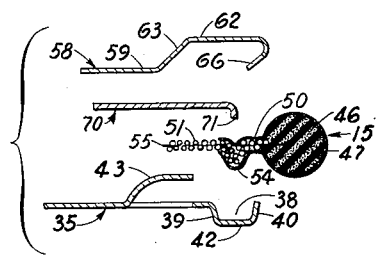
FIG. 3 is a sectional view taken on line 2—2 of FIG. 1 which is modified, for the purpose of illustration, to show the more important parts in an exploded relationship with respect to each other.

To illustrate the invention more clearly FIG. 3 shows mounting strip 35 and windlace 15, and two other parts to be described, in exploded relationship with respect to each other. The assembly operation involves, firstly, attaching mounting strip 35 to pillar side 21 as described above with mounting strip 35 being adjacent the inside edge 34 of the door opening and bordering the top and sides of the door opening. Windlace strip 15 is next attached with the protruding portion 54 thereof being disposed in channel 38 of mounting strip 35 and windlace portion 51 being disposed beneath tabs 43 which are then bent or pressed towards and against mounting strip 35 to hold windlace 15 in the position shown in FIG. 3.

A windlace and upholstery material retainer strip 58 is shown in FIGS. 2, 3, 4 and 5. Retainer strip 58 has, in section, two parallel flat portions which are a flat base portion 59 and a flat, toothed portion 62. Retainer portions 59 and 62 are offset so as to be in longitudinally spaced apart relationship and there is provided an obliquely extending portion 63 which joins portions 59 and 62 together. The free end of portion 62 is bent or curved rearwardly and inwardly and is provided with spaced apart teeth 66. Retainer strip 58 is of the same length as mounting strip 35 and is adapted to be attached thereto as with screws, not shown, as will be described further on.

Attached to the inner side of retainer strip 58, as by welding, is a windlace plate 70 which extends from base portion 59 in parallel relation to toothed portion 62. One side of plate 70 is bent to form a lip 71 which extends inwardly towards the protruding portion 54 of windlace 15. Plate 70 is attached to portion 59 of retainer 58 and positioned so that lip 71 is spaced inwardly from teeth 66 of retainer 58.

Plate 70 may also be the same length as mounting strip 35 and retainer 58 if desired but in practice it has been found that length of about eight inches is adequate if plate 70 is positioned at about the same level as the top of the seat 18.

With plate 70 first being attached to retainer 58, retainer 58 is attached as with screws, not shown, to mounting strip 35, the lengths of mounting strip 35 and retainer strip 58 being equal. With this construction lip 71 of plate 70 is pressed and held against protruding portion 54 of windlace 15 so as to forcibly hold protruding portion 54 in the channel 38 of mounting strip 35. Thus windlace 15 is firmly held in its inserted position with lip 71 functioning to resist the tendency of windlace 15 to be pulled out by reason of persons constantly brushing against it in entering and leaving the automobile.

The last step in trimming around the door opening is to first attach a cardboard type of material 74 to the interior walls of the vehicle, including around the door opening. Upholstery cloth 75 is then attached over the cardboard material and to the ceiling of the vehicle. The rough edge of the upholstery material 75 around the door opening is inserted between the core or bead part 46 of windlace 15 and the teeth 66 of retainer 58, as with a knife-like tool, and the edge of the material is caught and held by the teeth 66 and the upsolstery material is given a smooth finished appearance adjacent the windlace 15.

Figure 7:
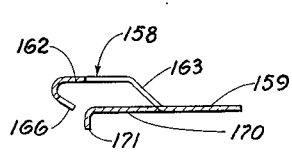
FIG. 7 is a sectional view taken on line VII—VII of FIG. 6.
Figure 4:
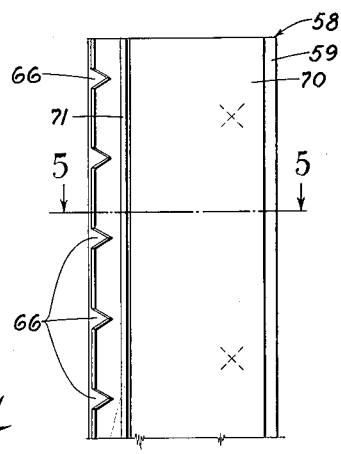
FIG. 4 shows a two piece windlace and upholstery material retainer strip, which represents a first embodiment of the invention, for attaching upholstery material and windlace material to the edge of a door opening of an automobile body.
Figure 6:
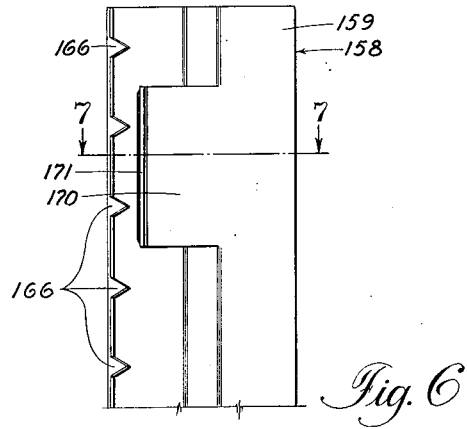
FIG. 6 shows a one piece retainer strip of the type shown in FIG. 4 and represents a second embodiment of the invention.

In FIGS. 6 and 7 there is shown a modified form of the invention in which, in effect, the windlace and upholstery material retainer strip 58 and the windlace plate 70 of the first embodiment of the invention shown in FIGS. 2 to 5 are combined.

The form of the invention shown in FIGS. 6 and 7 comprises a retainer strip 158 having offset parallel portions 159 and 162 which are joined by an obliquely extending portion 163. Portion 162 has the outer edge thereof turned inwardly and rearwardly and is provided with a plurality of teeth 166 which are the same as and for the same purpose as teeth 66 of the first embodiment of the invention. At any desired intervals lengthwise of retainer strip 158 there is formed by a cutting or lancing operation one or more windlace tabs 170 having an inwardly bent lip 171 which are also for the same purpose and function as windlace plate 70 and lip 71 thereof of the first embodiment of the invention.

The invention may be embodied in other specific forms without departing from the spirit or essential characteristics thereof. The embodiments of the invention described and shown are therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. Windlace attaching means for a door opening having inner and outer edges comprising, a mounting strip attachable so as to be adjacent to and border said inner edge of said opening on the side thereof away from said outer edge, said mounting strip having a recessed channel adjacent said inner edge of said opening and a plurality of lanced tabs spaced from said channel on the side thereof away from said inner edge, a windlace strip having a beaded portion, a generally flat portion attached to and extending radially from said beaded portion, a protruding portion on said flat portion between the attached and free ends thereof, said protruding portion being disposed in said mounting strip channel and the free end of said flat portion being held by said tabs, a windlace and upholstery material retainer strip having a flat base portion, a flat toothed portion parallel to said base portion and offset therefrom, an obliquely extending portion connecting said base and toothed portions, windlace plate means extending from said base portion in parallel relation to said toothed portion, lip means on said plate portion extending away from said toothed portion, a plurality of teeth on said toothed portion spaced from said lip means and extending downwardly and rearwardly towards said lip means, said retainer strip being attached to said mounting strip so that said lip engages and presses said protruding portion of said windlace into said channel of said mounting strip.

2. Windlace attaching means for a door opening having inner and outer edges comprising, a mounting strip attachable so as to be adjacent to and border said inner edge of said opening on the side thereof away from said outer edge, said mounting strip having a recessed channel adjacent said inner edge of said opening, a windlace strip having a beaded portion, a generally flat portion attached to and extending radially from said beaded portion, a protruding portion on said flat portion between the attached and free ends thereof, said protruding portion being disposed in said mounting strip channel, means on said mounting strip spaced from the channel thereof for holding the free end of said windlace flat portion, a windlace and upholstery material retainer strip having a flat base portion, a flat toothed portion parallel to said base portion and offset therefrom, an obliquely extending portion connecting said base and toothed portions, windlace plate means extending from said base portion in parallel relation to said toothed portion, lip means on said plate portion extending away from said toothed portion, a plurality of teeth on said toothed portion extending downwardly towards said plate portion, said retainer strip being attached to said mounting strip so that said lip engages and presses said protruding portion of said windlace into said channel of said mounting strip.

3. Windlace attaching means for a door opening having inner and outer edges comprising, a mounting strip attachable so as to be adjacent to and border said inner edge of said opening on the side thereof away from said outer edge, said mounting strip having a recessed channel adjacent said inner edge of said opening, a windlace strip having a beaded portion, a generally flat portion attached to and extending radially from said beaded portion, a protruding portion on said flat portion disposed in said mounting strip channel, windlace plate means having lip means thereon, said windlace plate means being attached to said mounting strip so that said lip engages and presses said protruding portion of said windlace into said channel of said mounting strip.

4. Windlace attaching means for a door opening having inner and outer edges comprising, a mounting strip attachable so as to be adjacent to and border said inner edge of said opening on the side thereof away from said outer edge, said mounting strip having a recessed channel adjacent said inner edge of said opening, a windlace strip having a beaded portion, a generally flat portion attached to and extending radially from said beaded portion, a protruding portion on said flat portion between the attached and free ends thereof, said protruding portion being disposed in said mounting strip channel, means on said mounting strip spaced from the channel thereof for holding the free end of said windlace flat portion, a windlace and upholstery material retainer strip having a flat base portion, a flat toothed portion parallel to said base portion and offset therefrom, an obliquely extending portion connecting said base and toothed portions, windlace plate means extending from said base portion in parallel relation to said toothed portion, lip means on said plate portion extending away from said toothed portion, said retainer strip being attached to said mounting strip so that said lip engages and presses said protruding portion of said windlace into said channel of said mounting strip.

5. Windlace attaching means for a door opening having inner and outer edges comprising, a mounting strip attachable so as to be adjacent said inner edge of said opening, said mounting strip having a recessed channel adjacent said inner edge of said opening, a windlace strip having a beaded portion, a generally flat portion attached to and extending from said beaded portion, a protruding portion on said flat portion between the attached and free ends thereof, said protruding portion being disposed in said mounting strip channel, means on said mounting strip spaced from the channel thereof for holding the free end of said windlace flat portion, a windlace and upholstery material retainer strip having a flat base portion and a flat toothed portion, windlace plate means extending from said base portion, lip means on said plate portion, said retainer strip being attached to said mounting strip so that said lip engages and presses said protruding portion of said windlace into said channel of said mounting strip.

References Cited in the file of this patent

UNITED STATES PATENTS

| | | |
|---|---|---|
| Re. 21,337 | Hamm | Jan. 30, 1940 |
| 1,751,746 | Morgana | Mar. 25, 1930 |